United States Patent Office 3,372,161
Patented Mar. 5, 1968

3,372,161
POLYCYCLICAMINOSULFONES
Leo A. Paquette, Columbus, Ohio, assignor to The Upjohn Company, Kalamazoo, Mich., a corporation of Michigan
No Drawing. Continuation-in-part of application Ser. No. 308,690, Sept. 13, 1963. This application Oct. 16, 1963, Ser. No. 316,520
10 Claims. (Cl. 260—247.1)

ABSTRACT OF THE DISCLOSURE

Enamines of the formula,

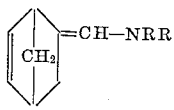

wherein NRR is a cyclic amino group, are condensed with methane or chloromethanesulfonyl chloride to give polycyclicaminosulfones of the formula

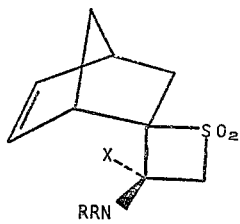

The unsaturation can be removed by hydrogenation and/or the free base can be converted to acid addition salts, N-oxides, N-oxide acid addition salts, and alkyl quaternary ammonium salts.

---

This application is a continuation-in-part of my copending application Ser. No. 308,690, filed Sept. 13, 1963, now abandoned.

This invention relates to novel compositions of matter and to methods for their preparation. In particular, this invention relates to novel polycyclicaminosulfones of the formula:

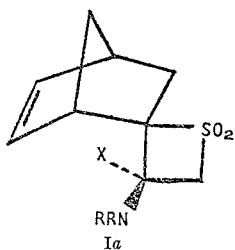
Ia wherein RRN— is a heterocyclic moiety, aziridinyl, azetidinyl, pyrrolidinyl, piperidino, N-lower-alkylpiperazino, hexahydroazepinyl, heptamethylenimino, octamethylenimino, morpholino, or thiomorpholino, each of said heterocyclic moieties having attached as substituents on carbon atoms thereof zero to 3 lower-alkyls, inclusive, and X is hydrogen or chlorine. When RRN— is a heterocyclic moiety with 2 or more alkyls, the alkyls can be the same or different.

Examples of lower-alkyl are methyl, ethyl, propyl, butyl, pentyl, hexyl, heptyl, and octyl, and isomeric forms thereof. Examples of heterocyclic moieties within the scope of RRN— are aziridinyl, 2-methylaziridinyl, 2-ethylaziridinyl, 2-butylaziridinyl, 2,3-dimethylaziridinyl, 2,2-dimethylaziridinyl, azetidinyl, 2-methylazetidinyl, 3-methylazetidinyl, 2-octylazetidinyl, 2,2-dimethylazetidinyl, 3,3-diethylazetidinyl, 2,4,4-trimethylazetidinyl, 2,3,4-trimethylazetidinyl, pyrrolidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, piperidino, 2 - methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethyl - 4 - octylpiperidino, 2,3,5-triethylpiperidino, N-methylpiperazino, N,2-dimethylpiperazino, N-butylpiperazino, N-octylpiperazino, hexahydroazepinyl, 2-ethylhexahydroazepinyl, 4 - tert - butylhexahydroazepinyl, 3-heptyl - hexahydroazepinyl, 2,4 - dimethylhexahydroazepinyl, 3,3 - dimethylhexahydroazepinyl, 2,4,6 - tripropylhexahydroazepinyl, heptamethylenimino, 2-methylheptamethylenimino, 5 - butyl - heptamethylenimino, 2,4 - diisopropylheptamethylenimino, 3,3 - diethylheptamethylenimino, 2,5,8 - trimethylheptamethylenimino, octamethylenimino, 3 - methyloctamethylenimino, 2,9-diethyloctamethylenimino, 4 - isooctyloctamethylenimino, morpholino, 2-ethylmorpholino, 2 - methyl - 5 - ethylmorpholino, 3,3 - dimethylmorpholino, 2,6 - di - tert-butylmorpholino, thiomorpholino, 3-methylthiomorpholino, 2,2-diethylthiomorpholino, 2,6 - dihexylthiomorpholino, and the like. In each of the above examples of heterocyclic moieties, the free valence, and hence the point of attachment to the thietane ring in Formula Ia is on the heterocyclic nitrogen atom.

The novel polycyclicaminosulfones of Formula Ia form N-oxides with peroxides, e.g., hydrogen peroxide.

The novel polycyclicaminosulfones of Formula Ia (free base or N-oxide free base form) exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel compounds of Formula Ia also form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalene-sulfonate, acetate, benzoate, salicylate, hydrocinnamate, succinate, lactate, or the like. Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and isomeric forms thereof.

The novel polycyclicaminosulfones of Formula Ia either in the free base or N-oxide free base form or as acid addition salts of the free base or N-oxide free base, for example, the hydrochloric acid addition salts, have anti-inflammatory activity as shown by the granuloma pouch technique in rats, and are useful in treating inflammatory conditions topically, locally, and systemically in mammals, e.g., man, cattle, horses, dogs, and cats, and in birds, e.g., poultry. Tests with animals have also shown these compounds to have central nervous system depressant effects, and the compounds are therefore useful for causing sedation. They also have antifungal activity and are useful for controlling fungi, e.g., *Tricophyton rubrum* and *Alternaria solani*, in various environments.

The higher alkyl quaternary ammonium salts of the novel compounds of Formula Ia, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula Ia are useful as intermediates in the preparation of said alkyl quaternary ammonium salts.

The thiocyanic acid addition salts of the polycyclicaminosulfones of Formula Ia, free base or N-oxide free base form, when condensed with formaldehyde, form resinous materials useful as pickling inhibitors according to U.S. Patents 2,425,320 and 2,606,155. The compounds of Formula Ia, free base or N-oxide free base form, also form fluosilicic acid addition salts and alkyl quaternary ammonium fluosilicates which are useful as mothproofing agents according to U.S. Patents 1,915,334 and 2,075,359.

The Formula Ia compounds of this invention, free base or N-oxide free base form, also form salts with penicillins. These salts have solubility characteristics which cause them to be useful in the isolation and purification of penicillins, particularly benzyl penicillin. Said salts can be formed either by neutralization of the free base form of a compound of Formula Ia with the free acid form of a penicillin, or by a metathetical exchange of the anion of an acid addition salt of a compound of Formula Ia, for example, the chloride ion of a hydrochloride, with the anionic form of a penicillin.

The novel polycyclicaminosulfones of Formula Ia can be prepared by reacting an enamine of the formula:

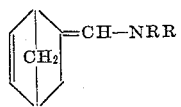

with a methanesulfonyl chloride of the formula:

$$X-CH_2-SO_2-Cl$$

wherein RRN— and X are as given above. The reaction advantageously is carried out in an inert solvent, e.g., ether, tetrahydrofuran, dioxane, benzene, toluene, etc., in the presence of an acid-binding agent, e.g., basic tertiary amines, such as, dimethylaniline, trimethylamine, N-methylpyrrolidine, etc. The temperature advantageously is kept between about 20° C. and about 50° C., though higher or lower temperatures, say from about 0° C. to about 100° C., can be used.

The saturated compounds are obtained by hydrogenation of the compounds of Formula Ia. The hydrogenation can be effected with platinum, palladium, or Raney nickel hydrogenation catalysts by procedures known in the art for saturating olefinic double bonds. Advantageously, the hydrogenation is effected in a lower-alkanol solution, e.g., ethanol, with a platinum oxide catalyst, e.g., Adams catalyst. Hydrogen is passed into the solution until the uptake of hydrogen ceases. It is ordinarily not necessary to use pressures greater than about 50 to 100 p.s.i.g. Higher pressures, however, can be used if desired.

The enamine starting compounds of Formula II can be prepared by reacting 5-norbornene-2-carboxaldehyde

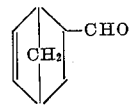

with a heterocyclic amine of the formula RRN—H wherein RRN— is as given above. Advantageously, the reaction is carried out in an inert solvent under dehydrating conditions, preferably in a solvent such as benzene or toluene which forms an azeotrope with water and under reflux so that the water can be separated by a water trap or separator.

The 5-norbornene-2-carboxaldehyde (III) can be prepared by the diene synthesis using cyclopentadiene as the diene and acrolein as the dienophile.

The following examples are illustrative of the process and products of the invention, but are not to be construed as limiting.

EXAMPLE 1

A. *Enamine of N-methylpiperazine and 5-norbornene-2-carboxaldehyde*

A solution of 122 g. (1 mole) of 5-norbornene-2-carboxaldehyde and 125 g. (1.25 moles) of N-methylpiperazine in 250 ml. of toluene was refluxed for 3 hr. under a water separator. The toluene was removed under reduced pressure and the residue was distilled to give 156 g. (76.5%) of the above enamine as a fraction boiling at 140–145° C. at 16 mm. Hg and having an index of refraction $n_D^{24}=1.5322$.

B. *3'-(4-methyl-1-piperazinyl)-spiro[5-norbornene-2,2'-thietane]-1',1'-dioxide*

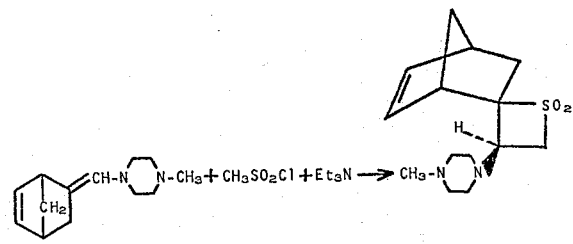

A stirred solution of 102 g. (0.50 mole) of the enamine of Part A and 50.6 g. (0.50 mole) of triethylamine in 400 ml. of dioxane was treated dropwise with a solution of 57.3 g. (0.50 mole) of methanesulfonyl chloride in 50 ml. of dioxane. When the addition was completed, the mixture was allowed to stand overnight at about 25° C. The precipitated triethylamine hydrochloride was separated by filtration and washed with ether. The combined filtrate and ether wash was evaporated. The dark oil thus obtained was dissolved in hot ethanol; the solution was filtered to remove some dark brown insoluble gum, and cooled. There was obtained 63.7 g. (45.2%) of 3'-(4-methyl-1-piperazinyl) - spiro[5-norbornene-2,2'-thietane]-1',1'-dioxide, M.P. 160–164° C. Several additional recrystallizations of this material from ethanol gave large white prisms, M.P. 162–164° C.

*Analysis.*—Calcd. for $C_{14}H_{22}N_2O_2S$: C, 59.54; H, 7.85; N, 9.92; S, 11.35. Found: C, 59.75; H, 7.85; N, 9.80; S, 11.31.

C. *3'-(4-methyl-1-piperazinyl)-spiro[norbornane-2,2'-thietane]-1',1'-dioxide hydrochloride*

A 5.6 g. (0.02 mole) sample of the olefinic amine of Part B was dissolved in 150 ml. of ethanol containing 100 mg. of Adams platinum oxide catalyst and hydrogenated in a Parr apparatus at an initial pressure of 50 p.s.i. Hydrogen uptake ceased after the consumption of 1 mole. The catalyst was removed by filtration and the solvent was evaporated under reduced pressure. The residual free base was dissolved in ether and ethereal hydrogen chloride was added to the solution. The resulting solid was recrystallized from ethanol-ether. There was obtained 6.4 g. (100%) of 3'-(4-methyl-1-piperazinyl)-spiro[norbornane-2,2'-thietane]-1',1'-dioxide hydrochloride as a white solid, M.P. 273° C. (dec.). On recrystallization the pure hydrochloride was obtained as small shiny platelets, M.P. 273° C. (dec.).

*Analysis.*—Calcd. for $C_{14}H_{25}ClN_2O_2S$: C, 52.40; H, 7.85; N, 8.73; S, 9.99. Found: C, 52.20; H, 7.82; N, 8.71; S, 9.87.

D. *1,1-dimethyl-4-{spiro[5-norbornene-2,2'-thietane]-3'-yl} piperazinium p-toluenesulfonate 1',1'-dioxide monohydrate*

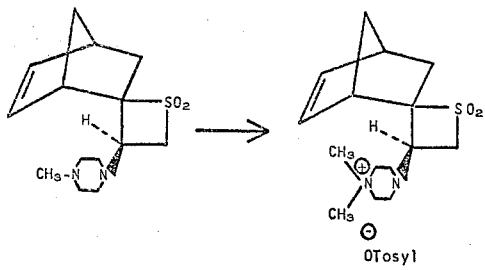

A solution of 5.6 g. (0.02 mole) of the base of Part B and 4.1 g. (0.022 mole) of methyl p-toluenesulfonate in 50 ml. of ethanol was refluxed for 3 hr. The solvent was removed under reduced pressure and the residue crystallized on trituration with ethanol-ether. After drying the solid, there was obtained 9.3 g. (96.0%) of 1,1-dimethyl - 4 - {spiro - [5 - norbonene - 2,2' - thietane] - 3'-yl}piperazinium p-toluenesulfonate 1',1'-dioxide monohydrate as a white powder, M.P. 132–134° C. The pure quaternary salt was obtained as small, shiny platelets from ethanol-ether, M.P. 136° C. (dec.).

*Analysis.*—Calcd. for $C_{22}H_{34}N_2O_6S_2$: C, 54.29; H, 7.04; N, 5.76; S, 13.18. Found: C, 54.24; H, 6.94; N, 5.69; S, 13.13.

EXAMPLE 2

A. *Enamine of morpholine and 5-norbornene-2-carboxaldehyde*

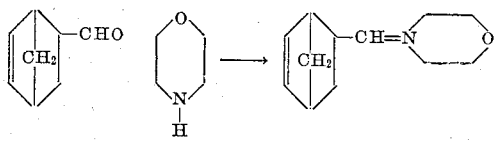

A solution of 244 g. (2.0 moles) of 5-norbornene-2-carboxaldehyde and 213 g. (2.5 moles) of morpholine in 500 ml. of toluene was refluxed for 3 hr. under a water separator. The toluene was removed under reduced pressure and the residue was distilled to give 310 g. (81.2% yield) of the above enamine, B.P. 132–135° C. at 14 mm. Hg, $n_D^{23}$ 1.5346.

B. *3'-morpholino-spiro[5-norbornene-2,2'-thietane]-1',1'-dioxide*

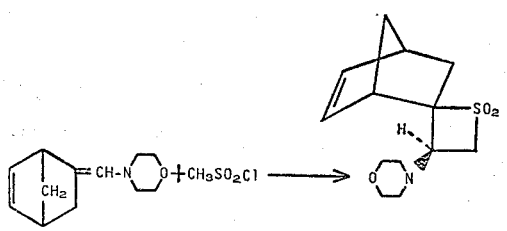

To a stirred solution of 95.6 g. (0.50 mole) of the enamine of Part A and 50.6 g. (0.50 mole) of triethylamine in 400 ml. of dioxane was added dropwise a solution of 57.3 g. (0.50 mole) of methanesulfonyl chloride in 50 ml. of dioxane. When the addition was completed, the mixture was allowed to stand overnight at about 25° C. The precipitated triethylamine hydrochloride was separated by filtration and washed with ether. The combined filtrate and ether wash was evaporated to a black oil which was dissolved in ether and the solution was chromatographed on a column of magnesium silicate. Elution with ether and evaporation gave crystalline fractions which were recrystallized from ethanol and dried. There was obtained 100.3 g. (76.6%) of 3'-morpholino-spiro-[5-norbornene-2,2'-thietane]-1',1'-dioxide as white crystals, M.P. 109–114° C. Several recrystallizations of this material from ethanol gave the compound as a white solid, M.P. 118–121° C.

*Analysis.*—Calcd. for $C_{13}H_{19}NO_3S$: C, 57.96; H, 7.11; N, 5.20; S, 11.90. Found: C, 57.73; H, 7.18; N, 5.23; S, 11.90.

C. *3'-morpholino-spiro[5-norbornene-2,2'-thietane]-1',1'-dioxide hydrochloride*

A 10.0 g. (0.037 mole) sample of the olefinic amine of Part B (M.P. 118–121° C.) was dissolved in ether and treated with a slight excess of ethereal hydrogen chloride. The resulting solid was filtered and recrystallization from ethanol-ether gave 3' - morpholino-spiro[5 - norbornene-2,2'-thietane]-1',1'-dioxide hydrochloride as white prisms, M.P. 225–226° C. (dec.).

*Analysis.*—Calcd. for $C_{13}H_{20}ClNO_3S$: C, 51.05; H, 6.59; N, 4.58; S, 10.49. Found: C, 51.35; H, 6.20; N, 4.71; S, 10.49.

D. *3'-morpholino-spiro[5-norbornene-2,2'-thietane]-1',1'-dioxide p-toluenesulfonate*

A solution of 5.4 g. (0.020 mole) of the olefinic amine of Part B (M.P. 118–121° C.) and 4.1 g. (0.022 mole) of methyl p-toluenesulfonate in 50 ml. of ethanol was refluxed for 4 hr. The solution was cooled and ether was added until the solution became cloudy. Further cooling caused precipitation of 6.6 g. of white solid, M.P. 204–209° C. Two recrystallizations of this solid from ethanol-ether gave 3' - morpholino-spiro[5-norbornene-2,2'-thietane]-1',1'-dioxide p-toluenesulfonate, M.P. 217–218° C.

*Analysis.*—Calcd. for $C_{20}H_{27}NO_6S_2$: C, 54.40; H, 6.16; N, 3.17; S, 14.52. Found: C, 54.40; H, 6.08; N, 3.35; S, 14.60.

On treatment of this acid addition salt with an excess of aqueous ammonium hydroxide and extraction with methylene chloride, the free base was obtained as a white solid, M.P. 128–129° C.

E. *4-methyl-4-{spiro[5-norbornene-2,2'-thietane]-3'-yl}morpholinium p-toluenesulfonate 1',1'-dioxide*

A mixture of 13.5 g. (0.05 mole) of the olefinic amine of Part B (M.P. 118–121° C.) and 13.0 g. (0.07 mole) of methyl p-toluenesulfonate was heated on a steam bath for 4 hr. The solution which first formed slowly deposited a crystalline solid. After two recrystallizations from ethanol-ether there was obtained 4-methyl-4-{spiro[5-norbornene-2,2'-thietane]3'-yl}morpholinium p - toluenesulfonate 1',1-dioxide as small white platelets, M.P. 244° C. (dec.).

*Analysis.*—Calcd. for $C_{21}H_{29}NO_6S_2$: C, 55.36; H, 6.41; N, 3.08; S, 14.08. Found: C, 55.34; H, 6.41; N, 2.98; S, 14.19.

F. *3-morpholino-spiro[norbornane-2,2'-thietane]1',1'-dioxide hydrochloride*

A 10.8 g. (0.035 mole) sample of the olefinic amine of Part B (M.P. 118–121° C.) was hydrogenated by the procedure of Part C of Example 1 and the obtained free base was converted to its hydrochloride by the procedure of Part C of Example 1. There was obtained 10.6 g. (98.3%) of 3'-morpholino-spiro[norbornane-2,2'-thietane]-1',1-dioxide hydrochloride as a white solid, M.P.

221–227° C. (dec.). Pure hydrochloride was obtained as shiny white platelets from ethanol-ether, M.P. 241–242° C. (dec.).

*Analysis.*—Calcd. for $C_{13}H_{22}ClNO_3S$: C, 50.72; H, 7.20; N, 4.55; S, 10.42. Found: C, 50.87; H, 7.28; N, 4.60, S, 10.45.

EXAMPLE 3

*4'-chloro-3'-morpholino-spiro[5-norbornene-2,2'-thietane]-1',1'-dioxide*

A solution of 47.8 g. (0.25 mole) of the enamine of Part A of Example 2 and 25.3 g. (0.25 mole) of triethylamine in 200 ml. of dioxane was treated with 37.3 g. (0.25 mole) of chloromethanesulfonyl chloride by the procedure of Part B of Example 1. The resulting black oil was chromatographed on a column of magnesium silicate and eluted with ether. There was obtained 4'-chloro-3'-morpholinospirol [5-norbornene - 2,2' - thietane]-1',1'-dioxide as a gum which slowly crystallized, 36.9 g. (48.7%). Fractional crystallization of this material from ethanol afforded two solids:

Isomer A, M.P. 162–164° C. (from ethanol), white prisms.

*Analysis.*—Calcd. for $C_{13}H_{18}ClNO_3S$: C, 51.39; H, 5.97; N, 4.61; S, 10.55. Found: C, 50.86; H, 5.36; N, 4.18; S, 10.66.

Isomer B, M.P. 125–126° C. (from ethanol), white powder.

Isomer A has the following formula:

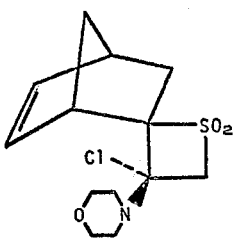

Isomer B has the following formula:

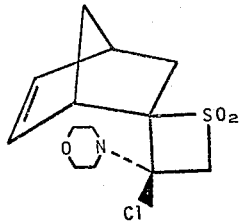

*Analysis.*—Found: C, 51.70; H, 6.09; N, 4.50; S, 10.76.

On hydrogenation by the procedure of Example 1, Part C, the corresponding saturated isomers are obtained.

EXAMPLE 4

A. *Enamine of pyrrolidine and 5-norbornene-2-carboxaldehyde*

Pyrrolidine and 5-norbornene-2-carboxaldehyde were condensed by the procedure of Example 1, Part A, to give the above enamine boiling at 116–121° C. at 15 mm. Hg and having an index of refraction $n_D^{23}=1.5378$.

B. *3'-(1-pyrrolidinyl)-spiro[5-norbornene-2,2'-thietane]-1',1'-dioxide hydrochloride*

A solution of 87.6 g. (0.50 mole) of the enamine of Part A and 50.6 g. (0.50 mole) of triethylamine in 400 ml. of dioxane was treated with 57.3 g. (0.50 mole) of methane-sulfonyl chloride by the procedure of Part B of Example 1. The dark oil which resulted was chromatographed on a column of magnesium silicate and eluted with ether. The pale yellow oil (the free base) thus obtained was dissolved in ether and ethereal hydrogen chloride was added to the solution. The resulting white solid was recrystallized from ethanol-ether, yielding 92.0 g. (63.5%) of 3'-(1-pyrrolidinyl)-spiro[5-norbornene-2,2'-thietane]-1',1'-dioxide hydrochloride, M.P. 232–233° C. (dec.). The pure hydrochloride was obtained as a white powder from ethanol-ether, M.P. 238° C. (dec.).

*Analysis.*—Calcd. for $C_{13}H_{20}ClNO_2S$: C, 53.87; H, 6.95; N, 4.83; S, 11.06. Found: C, 53.77; H, 7.03; N, 4.51; S, 11.13.

C. *3'-(1-pyrrolidinyl)-spiro[norbornane-2,2'-thietane]-1',1'-dioxide hydrochloride*

A solution of 11.6 g. (0.04 mole) of the olefinic hydrochloride of Part B in 150 ml. of ethanol was hydrogenated by the procedure of Example 1, Part C. There was obtained 10.2 g. (88.0%) of 3'-(1-pyrrolidinyl)-spiro [norbornane-2,2' - thietane]-1',1'-dioxide hydrochloride, M.P. 228–230° C. Pure hydrochloride was obtained as white microplatelets from ethanol-ether, M.P. 233–234° C. with prior sintering.

*Analysis.*—Calcd. for $C_{13}H_{22}ClNO_2S$: C, 53.50; H, 7.60; N, 4.80; S, 10.99. Found: C, 53.02, H, 7.57; N, 4.79; S, 11.05.

EXAMPLE 5

A. *Enamine of hexahydroazepine and 5-norbornene-2-carboxaldehyde*

Hexahydroazepine and 5-norbornene-2-carboxaldehyde were condensed by the procedure of Example 1, Part A, to give the above enamine boiling at 138–144° C. at 16 mm. Hg and having an index of refraction $n_D^{25}=1.5355$.

B. *3'-(1-hexahydroazepinyl)-spiro[5-norbornene-2,2'-thietane]-1',1'-dioxide hydrochloride*

A solution of 52 g. (0.256 mole) of the enamine of Part A and 25.9 g. (0.256 mole) of triethylamine in 125 ml. of dioxane was treated with 29.3 g. (0.256 mole) of methane-sulfonyl chloride by the procedure of Example 1, Part B. Chromatography of the resulting black oil on basic alumina and elution with ether afforded a pale yellow solid. This free base material was converted to its hydrochloride by treatment of an ethereal solution with ethereal hydrogen chloride, and the resulting white solid was recrystallized from ethanol-ether and dried. There was obtained 56.0 g. (69.0%) of 3'-(1-hexahydroazepinyl)-spiro[5-norbornene-2,2'-thietane]-1',1'-dioxide hydrochloride as a white solid, M.P. 212–216° C. (dec.). Two additional recrystallizations of this material from ethanol-ether afforded pure hydrochloride as small white granules, M.P. 221° C. (dec.).

*Analysis.*—Calcd. for $C_{15}H_{24}ClNO_2S$: C, 56.67; H, 7.61; N, 4.41; S, 10.09. Found: C, 56.96; H, 7.55; N, 4.28; S, 9.91.

C. *3'-(1-hexahydroazepinyl)-spiro[norbornane-2,2'-thietane]-1',1'-dioxide hydrochloride*

A 10.0 g. (0.0315 mole) sample of the olefinic hydrochloride of Part B was hydrogenated by the procedure of Example 1, Part C. The crude product (10 g., 100%) was twice recrystallized from aqueous ethanol-ether to give pure 3'-(1-hexahydroazepinyl)-spiro[norbornane-2,2'-thietane]-1',1'-dioxide hydrochloride as a fluffy white solid, M.P. 241° C. (dec.).

*Analysis.*—Calcd. for $C_{15}H_{26}ClNO_2S$: C, 56.31; H, 8.19; N, 4.38; S, 10.02. Found: C, 56.36; H, 8.27; N, 4.30; S, 10.11.

EXAMPLE 6

A. *Enamine of 2,2-dimethylpyrrolidine and 5-norbornene-2-carboxaldehyde*

2,2-dimethylpyrrolidine and 5-norbornene-2-carboxaldehyde were condensed by the procedure of Example 1, Part A, to give the above enamine boiling at 94–98° C. at 1 mm. Hg and having an index of refraction $$n_D^{25} = 1.5282$$

B. *3'-(2,2-dimethyl-1-pyrrolidinyl)-spiro[5-norbornene-2,2'-thietane]-1',1'-dioxide hydrochloride*

A solution of 59 g. (0.29 mole) of the enamine of Part A and 29.3 g. (0.29 mole) of triethylamine in 125 ml. of dioxane was treated with 33.1 g. (0.29 mole) of methanesulfonyl chloride by the procedure of Example 1, Part B. Chromatography of the resulting black oil on basic alumina and elution with ether gave a pale yellow oil (free base) which was converted to its hydrochloride by treatment of an ethereal solution with ethereal hydrogen chloride. The resulting white solid was recrystallized from aqueous ethanol-ether and dried to give 55.0 g. (59.8%) of 3'-(2,2-dimethyl-1-pyrrolidinyl)-spiro[5 - norbornene-2,2'-thietane]-1',1'-dioxide hydrochloride, M.P. 224–226° C. (dec.). Two additional recrystallizations of this material from the same solvent system afforded the compound as a white powder, M.P. 234° C. (dec.).

*Analysis.*—Calcd. for $C_{15}H_{24}ClNO_2S$: C, 56.67; H, 7.61; N, 4.41; S, 10.09. Found: C, 56.39; H, 7.45; N, 4.56; S, 9.95.

C. *3'-(2,2-dimethyl-1-pyrrolidinyl)-spiro[norbornane-2,2'-thietane]-1',1'-dioxide hydrochloride*

A 10.0 g. (0.0315 mole) sample of the olefinic hydrochloride of Part B was hydrogenated by the procedure of Example 1, Part C. The crude product (10 g., 100%) was twice recrystallized from aqueous ethanol-ether to give pure 3'-(2,2-dimethyl-1 - pyrrolidinyl) - spiro[norbornane-2,2'-thietane] - 1',1' - dioxide hydrochloride as shiny white needles, M.P. 235° C. (dec.).

*Analysis.*—Calcd. for $C_{15}H_{26}ClNO_2S$: C, 56.31; H, 8.19; N, 4.38; S, 10.02. Found: C, 56.40; H, 8.11; N, 4.24; S, 9.90.

EXAMPLE 7

By substituting 2,5-dimethylpyrrolidine for 2,2-dimethylpyrrolidine in Example 6, there were obtained the enamine of 2,5-dimethylpyrrolidine and 5-norbornene-2-carboxaldehyde; 3'-(2,5-dimethyl-1-pyrrolidinyl)-spiro[5-norbornene-2,2'-thietane]-1',1'-dioxide and its hydrochloride; and 3'-(2,5 - dimethyl-1 - pyrrolidinyl) - spiro[norbornane-2,2'-thietane]-1',1'-dioxide hydrochloride. The olefinic base was obtained as flaky white prisms from ethanol, M.P. 102–104° C.

*Analysis.*—Calcd. for $C_{15}H_{23}NO_2S$: C, 64.02; H, 8.24; N, 4.98; S, 11.40. Found: C, 63.77; H, 8.06; N, 4.97; S, 11.34.

The hydrochloride of the olefinic base had a melting point of 207–209° C. (dec.) (from ethanol-ether).

*Analysis.*—Calcd. for $C_{15}H_{24}ClNO_2S$: C, 56.67; H, 7.61; N, 4.41; S, 10.09. Found: C, 56.76; H, 7.62; N, 4.61; S, 10.01.

The hydrochloride of the saturated base was obtained as fat, white prisms from ethanol-ether, M.P. 235–236° C. (dec.).

*Analysis.*—Calcd. for $C_{15}H_{26}ClNO_2S$: C, 56.31; H, 8.19; N, 4.38; S, 10.02. Found: C, 56.68; H, 8.41; N, 4.05; S, 9.91.

The starting enamine of 2,5-dimethylpyrrolidine and 5-norbornene-2-carboxaldehyde had a boiling point of 68–70° C. at 0.4 mm. Hg and an index of refraction $$n_D^{26} = 1.5068.$$

EXAMPLE 8

By substituting piperidine for pyrrolidine in Example 4, there was obtained 3'-piperidinospiro[5-norbornene-2,2'-thietane]1',1'-dioxide as a pale yellow oil. This base was converted to its hydrochloride, which was obtained as a greyish solid, M.P. 236° C. (dec.), which on three recrystallizations from ethanol-ether afforded pure hydrochloride as fine, white prisms, M.P. 243° C. (dec.).

*Analysis.*—Calcd. for $C_{14}H_{22}ClNO_2S$: C, 55.43; H, 7.30; N, 4.61; S, 10.55. Found: C, 55.45; H, 7.15; N, 4.54; S, 10.39.

On hydrogenation there was obtained 3'-piperidinospiro[norbornane-2,2'-thietane]-1',1' - dioxide hydrochloride as shiny white plates, M.P. 245° C. (dec.).

*Analysis.*—Calcd. for $C_{14}H_{24}ClNO_2S$: C, 54.97; H, 7.91; N, 4.58; S, 10.48. Found: C, 54.43; H, 7.97; N, 4.35; S, 9.85.

The starting enamine of piperidine and 5-norbornene-2-carboxaldehyde had a boiling point of 126–129° C. at 11 mm. Hg and an index of refraction $n_D^{26.5} = 1.5318$.

By substituting the N-methylpiperazine, morpholine, pyrrolidine, hexahydroazepine, 2,2-dimethylpyrrolidine, 2,5-dimethylpyrrolidine, and piperidine in Examples 1, 2, 4, 5, 6, 7, and 8 by other heterocyclic amines RRN—H corresponding to each of the other specific heterocyclic moieties RRN— given above, there are obtained the corresponding 3'-(RRN)-spiro[5-norbornene-2,2'-thietane]-1',1'-dioxides and 3' - (RRN) - spiro[norbornane - 2,2'-thietane]-1',1'-dioxides.

Similarly, by substituting the morpholine in Example 3 by other heterocyclic amines RRN—H corresponding to each of the other specific heterocyclic moieties RRN- given above, there are obtained the corresponding 4'-chloro-3'-(RRN)-spiro[5 - norbornene - 2,2' - thietane]-1',1'-dioxides and 4'-chloro-3'-(RRN)-spiro[norbornane-2,2'-thietane]-1',1'-dioxides.

I claim:

1. The free base form of a compound of the formula:

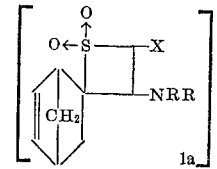

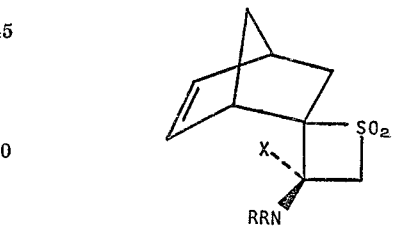

wherein RRN is a heterocyclic moiety, aziridinyl, azetidinyl, pyrrolidinyl, piperidino, N-loweralkylpiperazino, hexahydroazepinyl, heptamethylenimino, octamethylenimino, morpholino, or thiomorpholino, each of said heterocyclic moieties having attached as substituents on carbon atoms thereof zero to 3 loweralkyls, inclusive, and X is hydrogen or chlorine, and the free base acid addition salt, N-oxide, N-oxide acid addition salt, and alkyl quaternary ammonium salt forms thereof.

2. The free base of claim 1 wherein X is hydrogen and RRN— is N-methylpiperazino, and the free base acid addition salt, N-oxide, N-oxide acid addition salt, and alkyl quaternary ammonium salt forms thereof.

3. The free base of claim 1 wherein X is hydrogen and RRN— is morpholino, and the free base acid addition salt, N-oxide, N-oxide acid addition salt, and alkyl quaternary ammonium salt forms thereof.

4. The free base of claim 1 wherein X is chlorine and RRN— is morpholino, and the free base acid addition salt, N-oxide, N-oxide acid addition salt, and alkyl quaternary ammonium salt forms thereof.

5. The free base of claim 1 wherein X is hydrogen and RRN— is 1-pyrrolidinyl, and the free base acid addition salt, N-oxide, N-oxide acid addition salt, and alkyl quaternary ammonium salt forms thereof.

6. The free base of claim 1 wherein X is hydrogen and RRN— is 1-hexahydroazepinyl, and the free base acid addition salt, N-oxide, N-oxide acid addition salt, and alkyl quaternary ammonium salt forms thereof.

7. The free base of claim 1 wherein X is hydrogen and RRN— is 2,2-dimethyl-1-pyrrolidinyl, and the free base acid addition salt, N-oxide, N-oxide acid addition salt, and alkyl quaternary ammonium salt forms thereof.

8. The free base of claim 1 wherein X is hydrogen and RRN— is 2,5-dimethyl-1-pyrrolidinyl, and the free base acid addition salt, N-oxide, N-oxide acid addition salt, and alkyl quaternary ammonium salt forms thereof.

9. The free base of claim 1 wherein X is hydrogen and RRN— is piperidino, and the free base acid addition salt, N-oxide, N-oxide acid addition salt, and alkyl quaternary ammonium salt forms thereof.

10. The free base form of a compound of the formula:

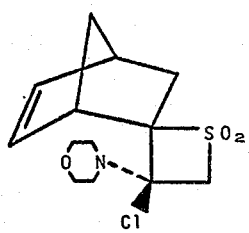

and the free base acid addition salt, N-oxide, N-oxide acid addition salt, and alkyl quaternary ammonium salt forms thereof.

References Cited

Stork et al.: J. Am. Chem. Soc., vol. 84, p. 313 (January 1962).

Paquette: J. Org. Chem., vol. 29, pages 2851 to 2855 (1964).

JOHN D. RANDOLPH, *Primary Examiner.*